US005580250A

United States Patent [19]
McKewen

[11] Patent Number: 5,580,250
[45] Date of Patent: Dec. 3, 1996

[54] DRAWING AID AND METHOD FOR DRAWING A SCENE IN ONE PLACE AND RECREATING IT IN ANOTHER

[76] Inventor: William McKewen, 21 North St., Montpelier, Vt. 05602

[21] Appl. No.: 374,340

[22] Filed: Jan. 17, 1995

[51] Int. Cl.$^6$ .................................................. G09B 11/06
[52] U.S. Cl. .................................................. 434/91; 434/85
[58] Field of Search ............................. 434/88, 90, 91, 434/92, 85, 81; 33/1 K; 24/67.11, 67.7, 298

[56] References Cited

U.S. PATENT DOCUMENTS

| | | | |
|---|---|---|---|
| 2,410,447 | 11/1946 | Juran | 434/91 |
| 2,862,328 | 12/1958 | Wadsworth | 24/67.7 X |
| 3,484,952 | 12/1969 | Coldren. | |
| 4,139,965 | 2/1979 | Currey et al.. | |
| 4,265,624 | 5/1981 | Krulwich. | |
| 4,379,364 | 4/1983 | Fish | 434/90 X |
| 4,439,159 | 3/1984 | Hunter | 434/85 |
| 4,457,717 | 7/1984 | Chika. | |
| 4,498,238 | 2/1985 | Vaughn | 434/90 X |
| 4,799,680 | 1/1989 | Weimar. | |
| 4,976,647 | 12/1990 | Axtell. | |
| 5,100,325 | 3/1992 | Cutler. | |
| 5,217,376 | 6/1993 | Gosselin. | |

OTHER PUBLICATIONS

The P–Scope Instruction Manual, Contour Drawing Inc., Valley Forge, PA, Received in PTO: Dec. 2, 1982.
*The Sax Arts and Crafts Catalog, 1988* at page 168 thereof depicting an artograph RT 210 Table Top Projector. The catalog was published by Sax Arts and Crafts, P.O. Box 51710, New Berlin, Wisconsin 53151. Telephone #: 414–784–6881. A copy is herewith submitted.

*Primary Examiner*—Gene Mancene
*Assistant Examiner*—Jeffrey A. Smith
*Attorney, Agent, or Firm*—John J. Welch, Jr., Esq.

[57] ABSTRACT

The instant device is a drawing aid consisting of a transparent window plate receivable by a detachable handle that folds upon itself, which transparent window plate has a small hole in it through which flexible wire to which a clip is attached is threaded and further which transparent window plate is hingeably attached at one side to one end of a straightedged rod hingeably attached at its other end to a second straightedged rod.

8 Claims, 4 Drawing Sheets

5,580,250

DRAWING AID AND METHOD FOR DRAWING A SCENE IN ONE PLACE AND RECREATING IT IN ANOTHER

CROSS REFERENCES TO PRIOR APPLICATIONS

There are no prior applications related to the instant one.

FEDERALLY SPONSORED RESEARCH AND DEVELOPMENT

There is no federally sponsored research and development associated with the instant invention.

BACKGROUND OF THE INVENTION

1. Field of the Invention

The instant invention relates to that category of devices that serve to facilitate a person's ability to draw pictures.

2. Possible Prior Art

The references set forth in the Information Disclosure Statement herewith submitted resemble somewhat but do not anticipate the instant invention.

A SUMMARY OF THE INVENTION

1. A Description of the Invention

The instant invention, a drawing aid is made up of a transparent window plate hingeably attached at the center of one of its sides to a straightedged rod. In the preferred embodiment, the straightedged rod is in turn hingeably attached to a second straightedged rod. The two straightedged rods are collectively equal in length, to a length of 13 to 14 inches similar to the length of part of an average sized person's forearm. Also, attached to the window plate by means of a piece of wire threaded through a small hole in the plate is a clip that enables one to hold fast to the plate a piece of transparent material. Finally, the instant invention is also with a detachable handle that serves to facilitate its use in a proper and effective manner.

2. Objects of the Invention

For most persons, freehand drawing of two dimensional pictures or three dimensional objects is indeed a most formidable task. One technique that is commonly accepted in respect of undertaking to teach freehand drawing to a person involves causing such a person to become familiar with the task of sketching rough guidelines serving to generally outline the metes and bounds of a scene sought to be drawn ultimately in the form of a picture. A number of devices remotely resembling the instant invention enable an art student to, for example, trace onto a piece of transparent or translucent paper a picture over which such paper would have been placed. However, no such related device currently exists such as enables a beginning art student without, at least, the aid of an artificial light source close to such student's eyes to roughly outline a two-dimensional picture or three-dimensional object from a distance and then, if desired, readily recreate that outline also from a distance onto a separate piece of paper not necessarily transparent or translucent, or for that matter onto often opaque material such as poster board, wood or cloth. The instant invention however fulfills in a highly novel and unique way, the objective of enabling a beginning artist to easily recreate on an opaque medium a two dimensional picture or three dimensional object initially found even elsewhere. Futhermore, enlargement or reduction of the size of the picture or object being recreated is possible and all such undertakings can be accomplished without the need for resort to any sort of artificial light source. Moreover, if desired, such recreated outlining can readily be done in reverse with the instant invention if one wishes to do so. Also, the instant invention is eminently portable and can readily be utilized for such drawing purposes anywhere indoors or outdoors. It is especially this readily recreated outlining capability with respect to opaque material to be used without the need for any such artificial light source that renders the instant invention not only unquestionably unique but also highly useful in the sense that it readily and conveniently serves to greatly enhance a beginning art student's ability not only to comprehend and come to grips with the intricacies of free hand recreation of shapes and figures but also to likewise comprehend and come to grips with, by virtue of ready size enlargement or size reductions capabilities as are afforded by the instant invention, the phenomenon of perspective in the midst of multiple shapes. In this way, that student's progress towards eventual success as an emerging artist is significantly accelerated.

A DESCRIPTION OF THE DRAWINGS

A DESCRIPTION OF THE PREFERRED EMBODIMENT

Figure 1:
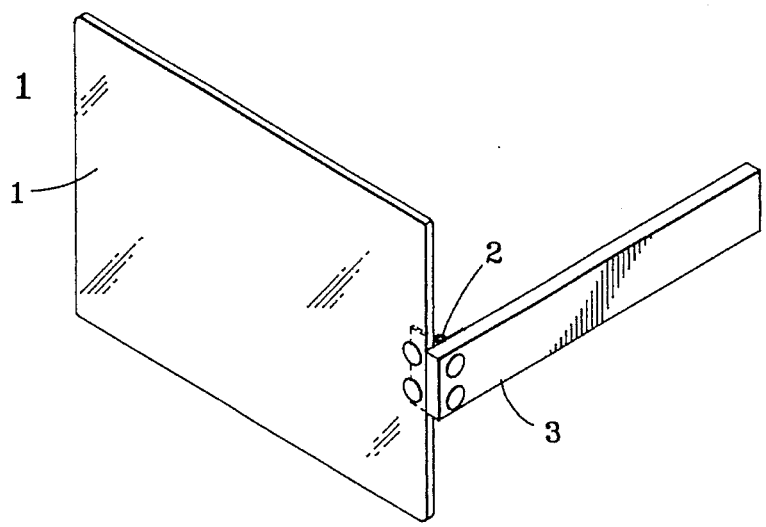
FIG. 1 is a perspective view of an embodiment of the instant invention.
Figure 2:
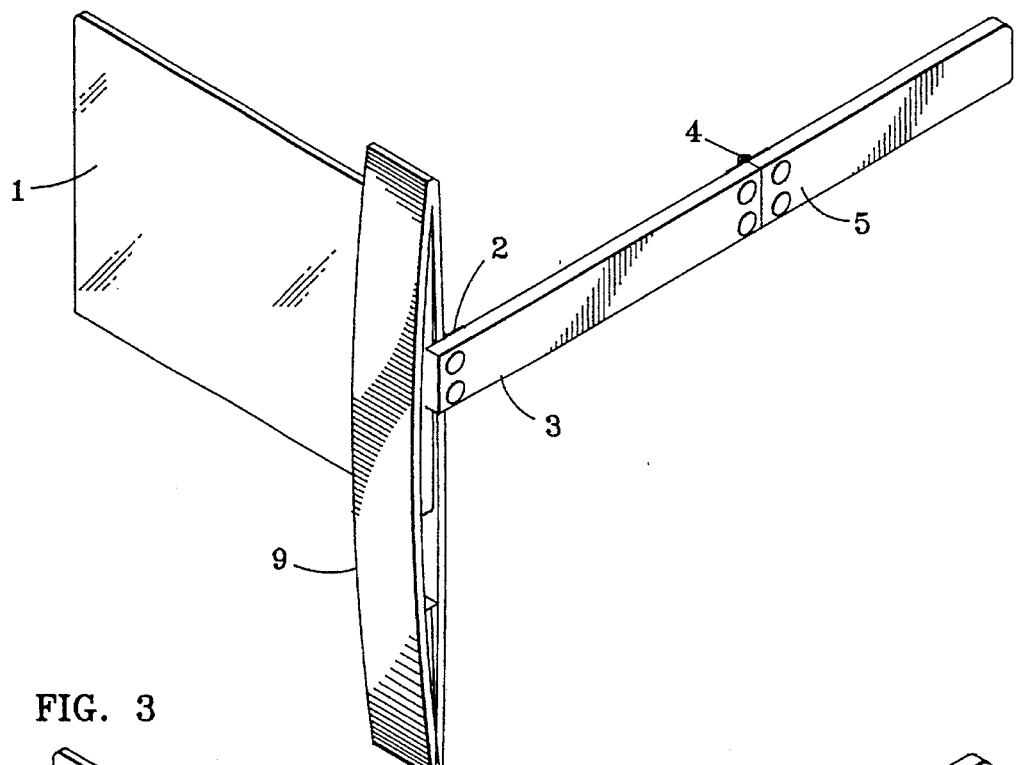
FIG. 2 is a perspective view of a second embodiment of the instant invention.
Figure 3:
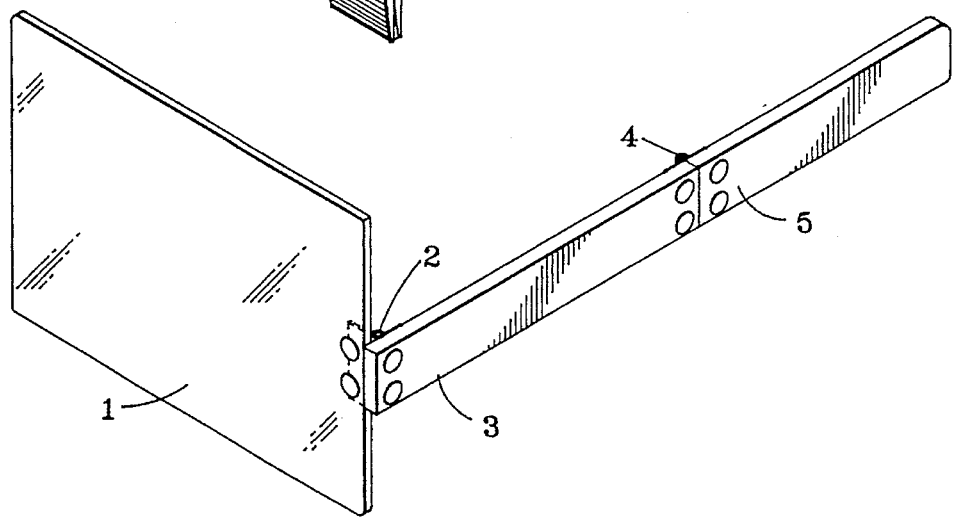
FIG. 3 is a perspective view of a second embodiment of the instant invention absent its detachable handle component.
Figure 8:
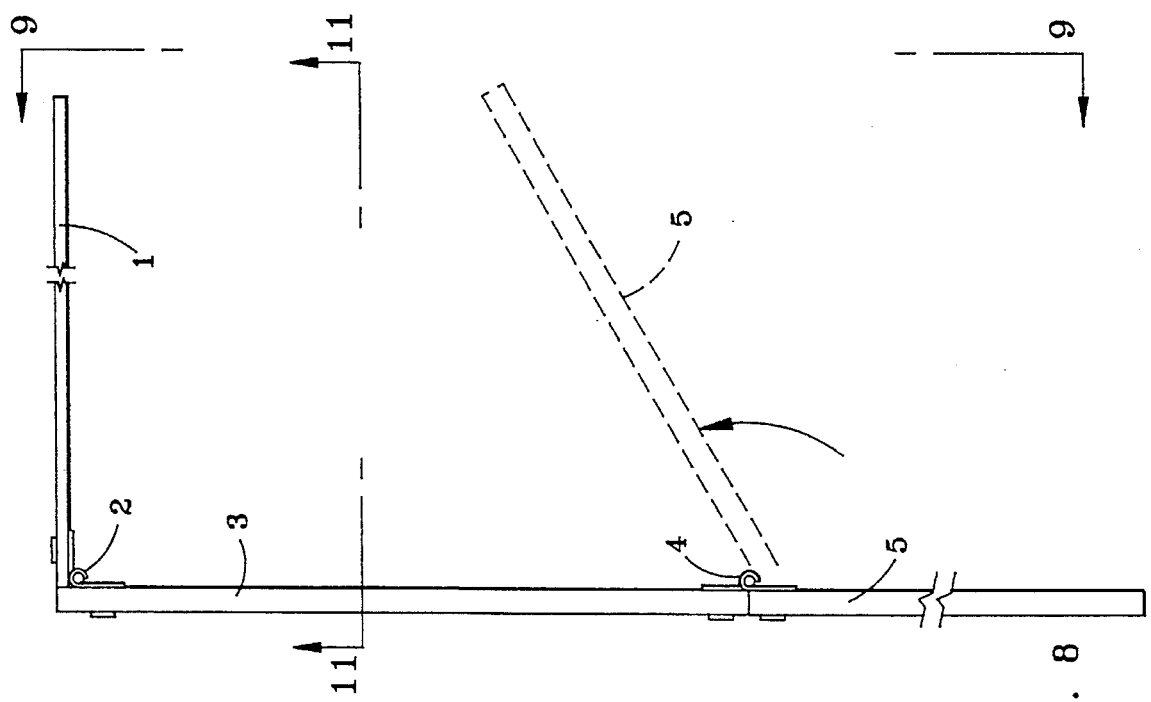
FIG. 8 is a top view of an embodiment of the instant invention depicting the manner in which a hingeably attached second straightedged rod component can fold inward at a hingepoint.
Figure 7:
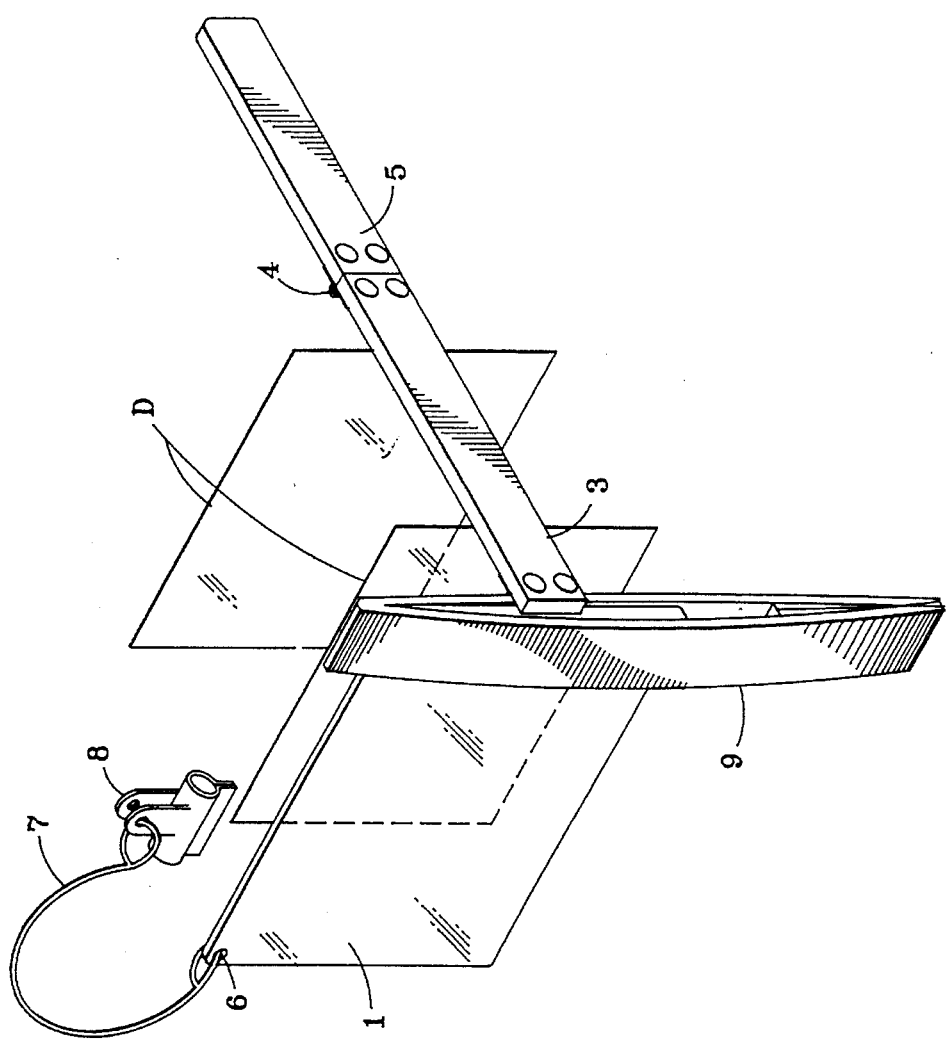
FIG. 7 is a perspective view of the preferred embodiment of the instant invention showing its clip component attached by means of flexible wire to the instant invention's transparent window plate component.
Figure 9:
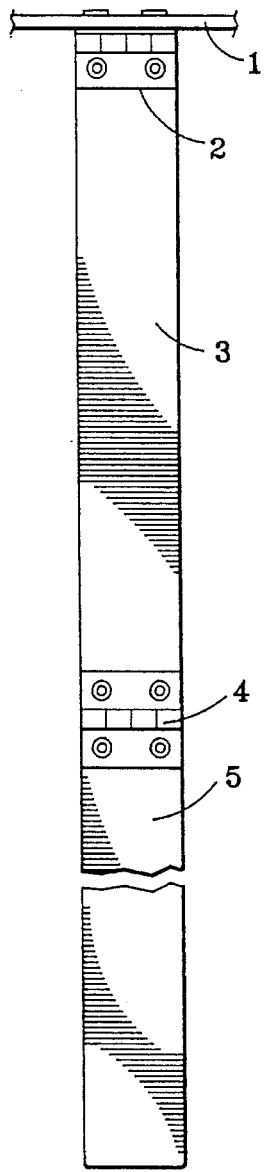
FIG. 9 is a side view taken along line 9—9 of the embodiment of the instant invention shown in FIG. 8.
Figure 10:
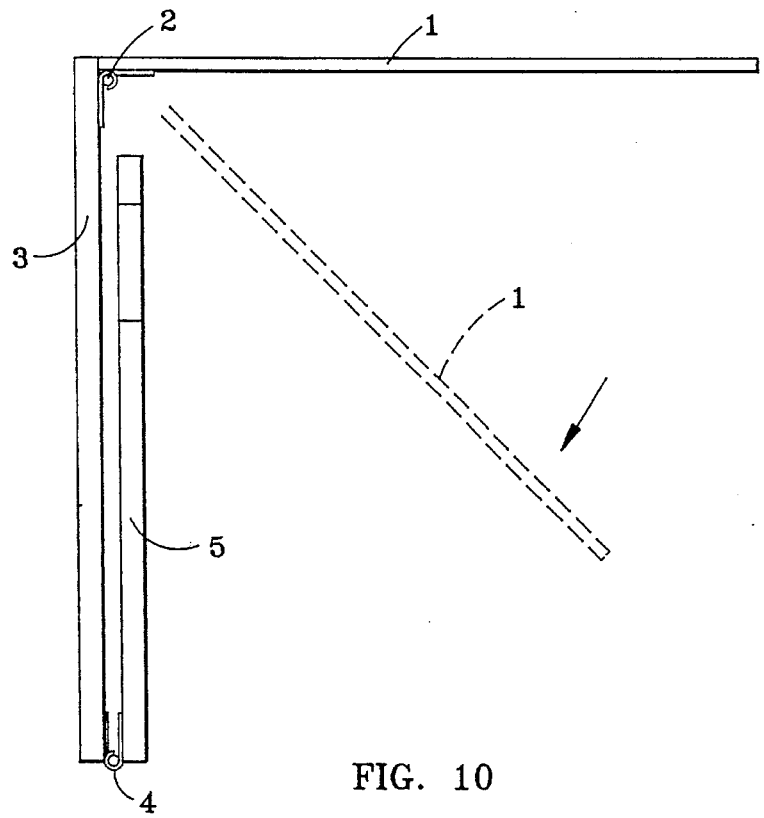
FIG. 10 is a top view of an embodiment of the instant invention depicting the manner in which a hingeably attached transparent window plate component can fold up to straightedged rod components to thus render the instant invention eminently portable and readily storable.
Figure 11:
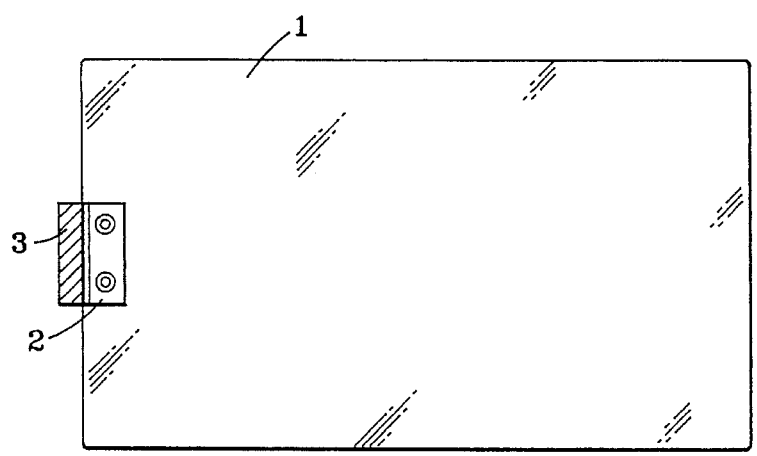
FIG. 11 is rear cross-sectional view taken along line 11—11 of the preferred embodiment of the instant invention shown in FIG. 8 as respects a sagittal cut throughts first straightedged rod component.

FIG. 1 shows the instant invention's transparent window plate component 1 hingeably attached via hinge assembly 2 to the instant invention's first straightedged rod component 3. This hinging and reinforcing assembly is seen in even better detail in FIGS. 8 and 10. FIG. 2 is a perspective view of a second embodiment of the instant invention. FIG. 3, is a perspective view of the second embodiment of the instant invention absent its detachable handle component 9. Also seen in FIG. 3 is hinge assembly 4 that attaches first straightedged rod component 3 to second straightedged rod component 5. FIG. 9 is a lateral view of both hinge assembly 2 and hinge assembly 4. The foldability of second straightedged rod component 5 via hinge assembly 4 about first straightedged rod component 3 and the foldability of transparent window plate component 1 via hinge assembly 2 about first straightedged rod component 3 are appreciated with resort to FIGS. 8 and 10. Clip 8 held via wire 7 to transparent window component 1 via threading though hole 6 as seen in FIG. 7 enables a transparency such as a mylar transparency D to be clipped and held fast to transparent window component 1.

Figure 5:
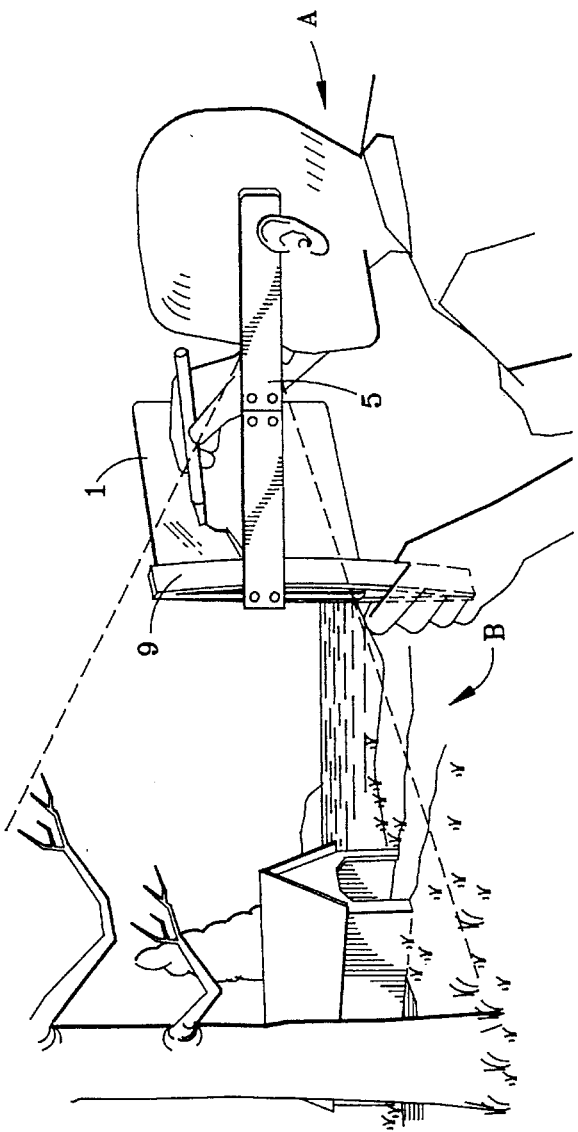
FIG. 5 depicts a person outlining a scene visualized through the transparent window plate component of the invention onto the window plate.
Figure 4:
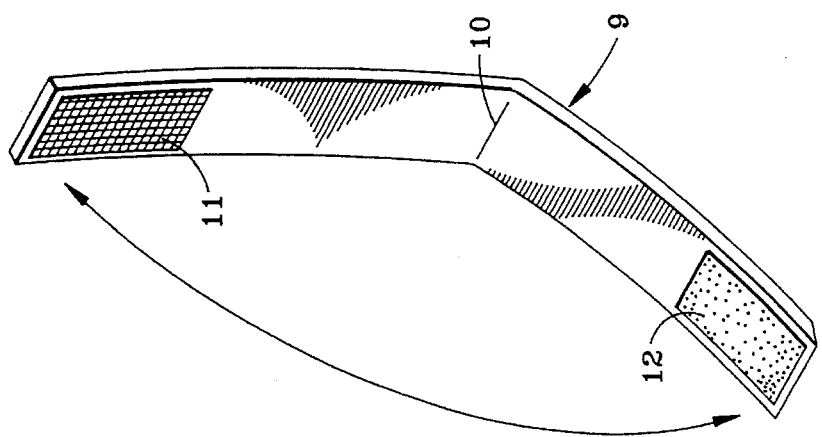
FIG. 4 is a rear plan view of the instant invention's detachable handle component.

As per FIG. 5, a person A using the instant invention can roughly trace a scene B at a distance onto transparent window plate component 1. Transparent window plate component 1 is readily washable with just a damp cloth. If one wishes to trace a scene B from a distance onto a transparency D instead of directly onto transparent window plate component 1, then, the preferred embodiment shown in FIG. 7 to hold transparency D fast to the inner surface of transparent window plate component 1 with clip 8 held by wire 7 to transparent window plate component 1 via threading through hole 6 would be utilized in lieu of the embodiment shown in FIG. 2. It should be noted that the artist shown in FIG. 5 is right-handed. A left-handed artist would simply hold the instant invention with the right hand and proceed to utilize the instant invention as is being done by the right-handed person who is shown in FIG. 5.

Figure 6:
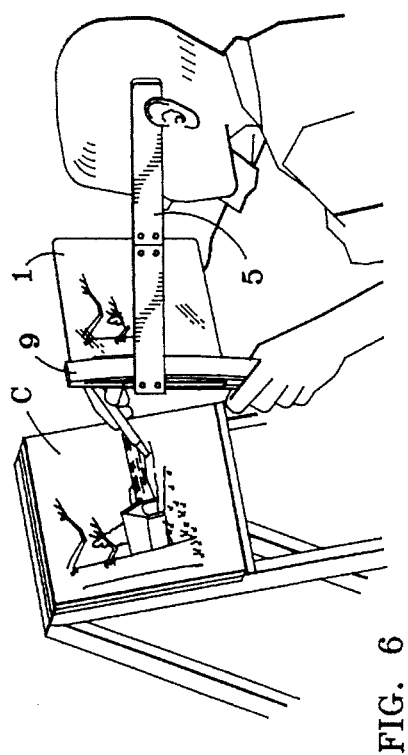
FIG. 6 depicts a person recreating the originally outlined scene onto a separate background with resort to continuing use of the instant invention.

The detachable handle component 9 of the instant invention is foldable about its centrally located foldpoint 10. At or about the two ends of handle component 9 there is found fastened in proximity to one end, touch fastener backing material backing 11 and fastened in proximity to the other end, hook tape 12. Backing 11 and tape 12 enable handle 9's two ends to remain affixed in ready apposition to one another when handle 9 is folded about foldpoint 10 over transparent window plate component 1 to facilitate ready holding of the instant invention in place during use as shown in FIGS. 5 and 6. A fastened snapholder and fastened snap button could be utilized in lieu of backing 11 and tape 12 to accomplish such fixation of the two ends of handle 9 during use. Detachable handle component 9 is also readily amenable to being easily adjusted positionally about the transparent window plate component 1 by the artist during use in order to accommodate the artist's particular wishes and component during use regarding drawing, for example, only part of scene B or drawing from close up, etc. In the event that a user's preference might be not to avail himself or herself of the advantages of the detachable handle component 9, component 9 can simply be removed and the artist can then hold the remnant portions of the instant invention in place during use simply by grasping straightedged rod 2 with his or her non-drawing hand. When a beginning artist utilizes the instant invention as shown in FIG. 5, the closer transparent window plate component 1 is held to the artist's eyes, the more of scene B, the artist can draw onto transparent window plate component 1. Conversely, the farther transparent window plate component 1 is held from the artist's eyes, the progressively less of scene B, the artist can draw onto transparent window plate component 1. In this way, the amount of detail in particular as respects perhaps only a desired part of a given scene B can readily be focused on and drawn by the artist. Moving transparent window plate component 1 away from the eyes prior to the commencement of drawing accommodates such attention to be paid to such detail in but a portion of scene B. Moving transparent window plate component 1 closer to the eyes prior to the commencement of drawing enables the artist to draw onto transparent window plate component 1 a less detailed but more comprehensive panoramic depiction of scene B. Once a drawing has been made as per the foregoing on transparent window plate component 1 or onto a transparency D clipped thereto by way of clip 8, then the artist can conveniently at a different time, shortly thereafter or much later in the same or in a different place undertake to utilize the instant invention as shown in FIG. 6. This is one of the instant invention's unique features in addition to its simplicity of construction namely its ready portability from one place to another. Such portability is possible not only because of the ready detachability of detachable handle component 9 but also because of the foldability of straightedged rod component 5 about hinge assembly 4 onto the inner side of straightedged rod component 3 followed by the foldability of transparent window plate component 1 about hinge assembly 2 onto the outer side of straightedged rod component 5 when it is sought to transport the instant invention from one place to another when not in use. Along this vein, it will be noted that straightedged rod component 5 is shorter than straightedged rod component 3 by a length equal to virtually the span of one-half of hinge assembly 2 in order to accommodate folding as noted above. Another of the instant invention's unique features is its inherent stability during use such as is made possible by virtue of the fact that straightedged rod component 3 extends beyond the locus of attachment of hinge assembly 2 onto transparent window plate component 1 as seen particularly in FIGS. 2, 8 and 7 for a distance equal to the depth of transparent window plate component 1. Such extension prevents any turning out of straightedged rod component 3, hinge assembly 4 and straightedged rod component 5 beyond an angle of 90° with reference to the lie of the plane of transparent window plate component 1 during use. As shown in FIG. 6, an artist places transparent window plate component 1 with all or a portion of scene B already drawn upon it or a transparency D held thereto via clip 8 with all or a portion of scene B already drawn upon it between the artist's eyes and a medium C sought to be drawn upon such as posterboard, canvas or any other form of opaque or, for that matter, transparent or translucent material amenable to being drawn upon. The closer transparent window plate component 1 or transparency D clipped thereto is held to an artist's eyes while drawing as shown in FIG. 6, the larger will be the reproduction, onto the medium C sought to be drawn upon of the portion of scene B previously drawn onto transparent window plate component 1 or transparency D clipped thereto as per the artist's doings as depicted in FIG. 5. The farther transparent window plate component 1 or transparency D clipped thereto is held from an artist's eyes while drawing as shown in FIG. 6, the smaller will be the reproduction, onto the medium C sought to be drawn upon, of the portion of scene B previously drawn onto transparent window plate component 1 or transparency D clipped thereto as per the artist's doings as depicted in FIG. 5. As can readily be noted with regards to the foregoing, enlargements or reductions of depictions of all or any portion of a scene B onto a medium C in accordance with an artist's particular preference at any one time is readily possible. Also, if desired, a simple turning of transparent window plate component 1 through an angle of 180° if no clipped on transparency D is utilized or if a clipped on transparency D is utilized, then a simple detachment and reversing of transparency D through an angle of 180° and reclipping it to transparent window plate component 1 prior to the commencement of drawing what is thereupon depicted onto medium C will thereby enable an artist to draw onto medium C the mirror image of what is on transparent window plate component 1 or on clipped on transparency D in either enlarged or reduced form. These facilities for ready enlargement, reduction or reversing of an image easily upon an opaque medium without any need whatsoever for any attached artificial light source at any time in terms of either creating the image or reproducing it make the instant invention, respectfully submitted, unquestionably useful as well as new and unique. Finally, once the doings as depicted in FIGS. 5 and 6 are completed, the instant invention can quickly be wiped clean with a damp cloth, folded up, put away and made ready to utilize again at any time.

What is claimed is:

1. A drawing aid, comprising:
   a. a transparent sketch plate;
   b. a straightedged rod hingeably connected at a first end to one lateral side of said transparent sketch plate; and
   c. a handle component detachably attache to said transparent sketch plate and being foldable upon itself with a strip of touch fastener material tape affixed to an inner side in proximity to a first one of its two ends and with a strip of hook tape affixed to an inner side in proximity to the other one of its two ends.

2. A drawing aid, comprising:
   a. a transparent sketch plate;
   b. a first straightedged rod hingeably connected at a first end to one lateral side of said transparent sketch plate;
   c. a handle component detachably attached to said transparent sketch plate and being foldable upon itself with a strip of touch fastener material tape affixed to an inner side in proximity to a first one of its two ends and with a strip of hook tape affixed to an inner side in proximity to the other one of its two ends; and
   d. a second straightedged rod hingeably connected at a first end to a second end of said first straightedged rod.

3. A drawing aid, comprising:
   a. a transparent sketch plate;
   b. a straightedged rod hingeably connected to a first end to one lateral side of said transparent sketch plate;
   c. a clip;
   d. a hole in said transparent sketch plate;
   e. a flexible wire threaded through said hole and tied at a first end to said transparent sketch plate as well as being affixed at a second end to said clip; and
   f. a handle component detachably attached to said transparent sketch plate and being foldable upon itself with a strip of touch fastener material affixed to an inner side in proximity to a first one of its two ends and with a strip of hook tape affixed to an inner side in proximity to the other one of its two ends.

4. A drawing aid, comprising:
   a. a transparent sketch plate;
   b. a first straightedged rod hingeably connected at a first end to one lateral side of said transparent sketch plate;
   c. a second straightedged rod hingeably connected at a first end to a second end of said first straightedged rod;
   d. a clip;
   e. a hole in said transparent sketch plate;
   f. a flexible wire threaded through said hole and tied at a first end to said transparent sketch plate as well as being affixed at a second end to said clip; and
   g. a handle component detachably attached to said transparent sketch plate and being foldable upon itself with a strip of touch fastener material affixed to an inner side in proximity to a first one of its two ends and with a strip of hook tape affixed to an inner side in proximity to the other one of its two ends.

5. A method for freehandedly drawing a still scene in one place and recreating it in another using a drawing aid comprising a transparent sketch plate; said method comprising the steps of:
   a. maintaining a grip with a first hand on said transparent sketch plate in a set position between the plane of one's eyes and the locus of a scene visible through said transparent sketch plate;
   b. drawing with a second hand said scene onto said transparent sketch plate;
   c. maintaining a grip with said first hand on said transparent sketch plate while drawing in a set position between the plane of one's eyes and the locus of a medium to be drawn upon, visible through said transparent sketch plate; and
   d. drawing with said second hand onto said medium said scene drawn upon said transparent sketch plate while looking at said medium through said transparent sketch plate.

6. A method for freehandedly drawing a still scene in one place and recreating it in another using a drawing aid comprising a transparent sketch plate through which a small hole has been punched, and a first straightedged rod hingeably attached at a first end to one side of transparent sketch plate and hingeably attached at a second end to a first end of a second straightedged rod shorter in length than said first straightedged rod; said method comprising the steps of:
   a. utilizing holding means to stabilize with a first hand said transparent sketch plate in a set position between the plane of one's eyes and the locus of a scene visible through said transparent sketch plate;
   b. drawing with a second hand said scene onto said transparent sketch plate;
   c. utilizing holding means to stabilize with said first hand said transparent sketch plate in a set position between the plane of one's eyes and the locus of a medium to be drawn upon, visible through said transparent sketch plate; and
   d. drawing with said second hand onto said medium said scene drawn upon said transparent sketch plate while looking at said medium through said transparent sketch plate.

7. A method for freehandedly drawing a still scene in one place and recreating it in another using a drawing aid comprising a transparent sketch plate through which a small hole has been punched, and a first straightedged rod hingeably attached at a first end to one side of said transparent sketch plate and through which said small hole, flexible wire to which a clip is attached is threaded and tied to said transparent sketch plate; said method comprising the steps of:
   a. affixing a piece of transparency by way of said clip to said transparent sketch plate;
   b. utilizing holding means to stabilize with a first hand said transparent sketch plate in a set position between the plane of one's eyes and the locus of a scene visible through said transparent sketch plate;

c. drawing with a second hand said scene onto said transparency held by said clip to said transparent sketch plate;

d. utilizing holding means to stabilize with said first hand said transparent sketch plate in a set position between the plane of one's eyes and the locus of a medium to be drawn upon, visible through said transparent sketch plate; and e. drawing with said second hand onto said medium said scene drawn upon said transparency held by said clip to said transparent sketch plate while looking at said medium through said transparent sketch plate.

8. A method for freehandedly drawing a still scene in one place and recreating it in another using a drawing aid comprising a transparent sketch plate through which a small hole has been punched, and a first straightedged rod hingeably attached at a first end to one side of said transparent sketch plate and hingeably attached at a second end to a first end of a second straightedged and shorter in length than said first straightedged rod; said method comprising the steps of:

a. affixing a piece of transparency by way of a clip to said transparent sketch plate;

b. utilizing holding means to stabilize with a first hand said transparent sketch plate in a set position between the plane of one's eyes and the locus of a scene visible through said transparent sketch plate;

c. drawing with a second hand said scene onto said transparency held by said clip to said transparent sketch plate;

d. utilizing holding means to stabilize with said first hand said transparent sketch plate in a set position between the plane of one's eyes and the locus of a medium to be drawn upon visible through said transparent sketch plate; and e. drawing with said second hand onto said medium said scene drawn upon said transparency held of said clip to said transparent sketch plate while looking at said medium through said transparent sketch plate.

* * * * *